A. B. COOLEY.
Dumping Car.
No. 28,969.
Patented July 3, 1860.
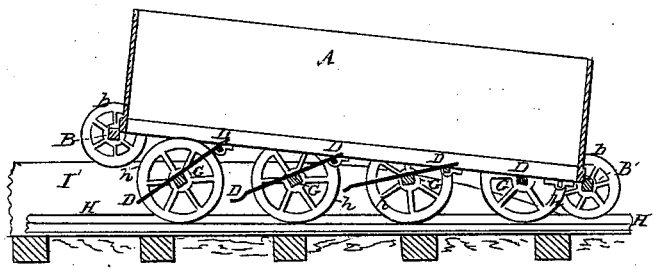
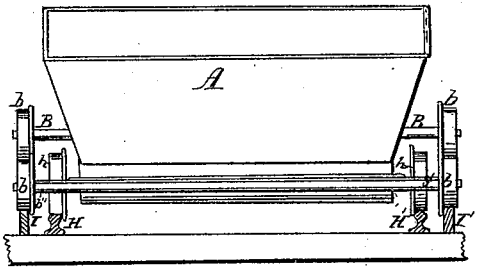
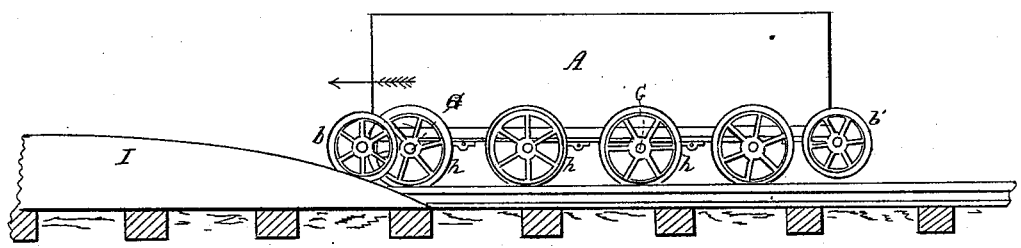
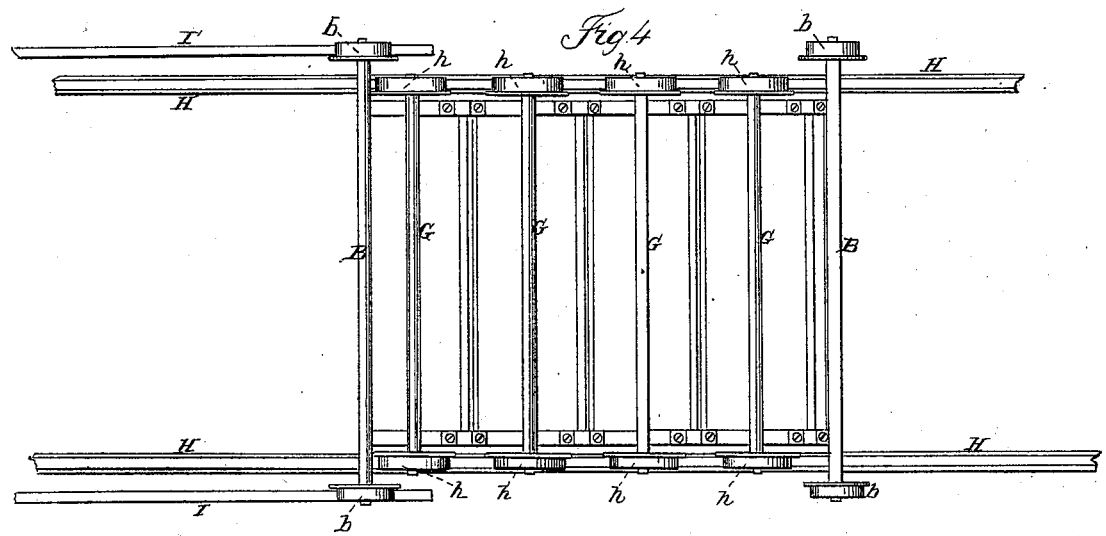
Witnesses,
Henry Howson
Inventor.
Aaron B Cooley

UNITED STATES PATENT OFFICE.

AARON B. COOLEY, OF PHILADELPHIA, PENNSYLVANIA.

DUMPING RAILROAD-CAR.

Specification of Letters Patent No. 28,969, dated July 3, 1860.

*To all whom it may concern:*

Be it known that I, AARON B. COOLEY, of the city of Philadelphia and State of Pennsylvania, have invented a new and Improved Dumping-Car; and I do hereby declare the following to be a full, clear, and exact description of the same, reference being had to the accompanying drawing and to the letters of reference marked thereon.

My invention consists of a car with a body of any suitable form and having, at or near its opposite ends, flanged wheels turning on permanent axles and having any convenient number of hinged doors carrying flanged wheels, the whole being combined with rails so constructed and arranged that as the car traverses the same, the above-mentioned doors may be self-opening, thereby discharging the load and self closing, thereby forming the bottom of the car ready for the reception of another load as fully described hereafter.

In order to enable others to make and use my invention I will now proceed to describe its construction and operation.

On reference to the accompanying drawing, which forms a part of this specification Figure 1, is a vertical section of my improved self dumping car, Fig. 2, an end view, Fig. 3, a side view and Fig. 4, a ground plan.

Similar letters refer to similar parts throughout the several views.

The body A of the car is of the oblong form represented in the drawings its opposite ends being vertical and its sides inclined.

To the lower corners at the opposite ends of the body are secured the permanent axles B and B' carrying the flanged wheels b b, and to the lower edge and opposite sides of the body are hinged a series of doors D D of such a width and so arranged that they shall overlap each other to a slight extent and form the bottom of the car.

To each door is secured an axle G carrying the flanged wheels h adapted to the rails H and H' along which the car has to traverse. On the outside of each of these rails and at a suitable distance from the same, supplementary rails I and I' are secured to the track at the point where the contents of the car have to be discharged; these supplementary rails which are arranged to receive the flanged wheels b b of the permanent axles B and B' being inclined at the opposite ends.

When the wheels h, h, bear on the rails H and H' and the wheels b b are free from contact with the supplementary rails, the doors D will be closed, the whole weight of the body of the car which is ready to receive its load tending to maintain them in this position. As the car moves in the direction of the arrow, however the wheels b b of the permanent front axle B come in contact with the supplementary rails I and I' and gradually ascend the inclined ends of these rails thereby raising the front end of the car, as seen in Fig. 1. At the same time the wheels h h of the doors, will by their own weight, that of the doors themselves, and that of the load thereon, remain in contact with the rails H and H' of the main track, so that the doors will, one after another, gradually assume a more and more inclined position as the car is brought under the control of the supplementary rails I and I' until the whole of the load is discharged. On the withdrawal of the car from the control of the supplementary rails the doors will close and from the bottom of the car which is now ready for the reception of another load to be discharged in the manner above described.

The rails H and H' may be discontinued at the point where the inclined supplementary rails I and I' are situated, in which case the doors will assume a vertical position one after the other the load being consequently discharged into the barge or other receptacle placed below the car.

The rails I and I' may be so constructed and arranged as to be readily detached from the side of the track and transferred to that point where a discharge of the contents of the car is desired.

It will be readily seen that by making the supplementary rail level, and by forming suitable inclined depressions in the rails H H' of the main track where the car has to be dumped, precisely the same result as regards the opening and closing of the doors may be attained.

Without confining myself to the precise form of car illustrated and described or to any particular number of doors, I claim as my invention and desire to secure by Letters Patent—

The body A of the car having at or near the opposite ends the wheels b b turning on permanent axles, and any convenient number of door D, carrying wheels $h$ $h$; in combination with rails H and H', and I and I' so constructed and arranged that, as the car traverses the said rails, the doors may be self opening and self closing as set forth for the purpose specified.

In testimony whereof, I have signed my name to this specification, in the presence of two subscribing witnesses.

AARON B. COOLEY.

Witnesses:
HENRY HOWSON,
JOHN WHITE.